(12) United States Patent
Hubbard, Jr. et al.

(10) Patent No.: US 9,387,914 B2
(45) Date of Patent: Jul. 12, 2016

(54) CONTROL SYSTEMS FOR PERSONAL PROPULSION DEVICES

(71) Applicant: FliHi IP LLC, New York, NY (US)

(72) Inventors: Donald G. Hubbard, Jr., Hollywood, FL (US); Niculae Mustatea, Sunrise, FL (US)

( * ) Notice: Subject to any disclaimer, the term of this patent is extended or adjusted under 35 U.S.C. 154(b) by 0 days.

(21) Appl. No.: 14/520,431

(22) Filed: Oct. 22, 2014

(65) Prior Publication Data

US 2016/0114878 A1    Apr. 28, 2016

(51) Int. Cl.
| | |
|---|---|
| *B63H 23/24* | (2006.01) |
| *B63H 11/04* | (2006.01) |
| *B63H 11/113* | (2006.01) |
| *B63H 21/21* | (2006.01) |
| *H01F 38/14* | (2006.01) |
| *H04B 5/00* | (2006.01) |

(52) U.S. Cl.
CPC ............... *B63H 23/24* (2013.01); *B63H 11/04* (2013.01); *B63H 11/113* (2013.01); *B63H 21/21* (2013.01); *H01F 38/14* (2013.01); *H04B 5/0037* (2013.01)

(58) Field of Classification Search
CPC ........ B63H 11/00; B63H 11/04; B63H 11/08; B63B 35/73; B64C 39/02
USPC ...................................... 440/38, 39
See application file for complete search history.

(56) References Cited

U.S. PATENT DOCUMENTS 7,900,867 B2 *    3/2011   Li ................................... 440/38
8,960,115 B2 *    2/2015   Frisky .................. B63B 35/731
                                                                440/39

* cited by examiner

*Primary Examiner* — Lars A Olson
(74) *Attorney, Agent, or Firm* — Nicholas R. Lewis

(57) ABSTRACT

A personal propulsion device for use with a pressurized fluid source having a throttle, the personal propulsion device including a passenger assembly; one or more fluid discharge ports coupled to the passenger assembly and operable to elevate the passenger assembly and a passenger into the air; a fluid delivery conduit in fluid communication with the one or more fluid discharge ports; a first inductance coil coupled to the fluid delivery conduit; a second inductance coil coupled to the fluid delivery conduit and rotatable with respect to the first inductance coil; and a throttle controller coupled to the passenger assembly, where the throttle controller is configured to transmit a signal across the first and second inductance coils to the pressurized fluid source.

20 Claims, 4 Drawing Sheets

CONTROL SYSTEMS FOR PERSONAL PROPULSION DEVICES

CROSS-REFERENCE TO RELATED APPLICATION

N/A

STATEMENT REGARDING FEDERALLY SPONSORED RESEARCH OR DEVELOPMENT

N/A

FIELD OF THE INVENTION

The present invention relates to systems, and methods of use thereof, for controlling and/or operating personal propulsion devices and systems.

BACKGROUND OF THE INVENTION

Recently, a number of water-powered recreational vehicles have become available, such as those described in in U.S. Pat. Nos. 7,258,301 and 8,336,805. These devices have a user-supporting or "body unit" assembly that allows a person to fly above and/or through the water. The body unit receives pressurized fluid through a hose attached to a personal watercraft that remains on the surface of the water. The body unit of these devices can include a throttle control or other input device that electronically communicates with the watercraft providing the pressurized fluid to the body unit. The electronic communication is provided through a cable or wire that runs along the length of the hose. However, during operation of these recreational vehicles, numerous maneuvers may be performed that can twist or otherwise exert large amounts of force on the electrical cable or wire. In addition, the devices employ high pressure fluid flow (including salt water if used in the ocean) in the immediate vicinity to the electronic cable or wire. These conditions present challenges for providing reliable control communication between components of the personal propulsion systems. The present disclosure provides improved control systems to overcome such harsh performance conditions.

SUMMARY OF THE INVENTION

The present disclosure provides a connector, including a first connector segment defining a first end, a second end, and a passage therethrough; a first electrically conductive coil attached to the first connector segment; and a second electrically conductive coil rotatably coupled to the first connector segment adjacent to the first inductance coil. The first end of the first connector segment may be configured to attach to a first fluid conduit substantially coaxially with the passage, and/or the second end of the first connector segment may be configured to attach to a second fluid conduit substantially coaxially with the passage. At least one of the first and second electrically conductive coils may circumscribe an exterior of the passage, and/or at least one of the first and second electrically conductive coils may be coaxial with the passage. The first and second electrically conductive coils may be configured to transmit an inductance signal therebetween, may be electrically insulated from each other, and/or may each be contained within a waterproof enclosure.

The present disclosure also provides a personal propulsion device, including a passenger assembly configured to support a person; one or more fluid discharge ports coupled to the passenger assembly; a fluid delivery conduit in fluid communication with the one or more fluid discharge ports; a first electrically conductive element coupled to the fluid delivery conduit; a second electrically conductive element coupled to the fluid delivery conduit and rotatable with respect to the first electrically conductive element; and a throttle controller in electrical communication with the first electrically conductive element. The first and second electrically conductive elements may each include coils that are electrically insulated from one another. The first and second electrically conductive elements may be coaxially disposed around the fluid delivery conduit. The passenger assembly may include at least one of a backrest configured to attach to a person's torso and a platform configured to attach to a person's feet. The personal propulsion device may include a pressurized fluid source in fluid communication with the fluid delivery conduit, where the throttle controller is operable to modify operation of the pressurized fluid source. The pressurized fluid source may be a personal watercraft. The throttle controller may communicate with the pressurized fluid source through an inductance signal bridging the first and second electrically conductive elements.

A personal propulsion device for use with a pressurized fluid source having a throttle is also provided, the personal propulsion device including a passenger assembly; one or more fluid discharge ports coupled to the passenger assembly and operable to elevate the passenger assembly and a passenger into the air; a fluid delivery conduit in fluid communication with the one or more fluid discharge ports; a first inductance coil coupled to the fluid delivery conduit; a second inductance coil coupled to the fluid delivery conduit and rotatable with respect to the first inductance coil; and a throttle controller coupled to the passenger assembly, where the throttle controller is configured to transmit a signal across the first and second inductance coils to the pressurized fluid source. The signal transmitted to the pressurized fluid source may modify delivery of a pressurized fluid from the pressurized fluid source to the one or more fluid discharge ports. The device may include a mechanical actuator attached to the throttle of the pressurized fluid source, where the mechanical actuator is in communication with the throttle controller. The mechanical actuator may mechanically adjust the throttle of the pressurized fluid source in response to a signal from the throttle controller, and the actuator may include at least one of a servo motor and a clamp.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
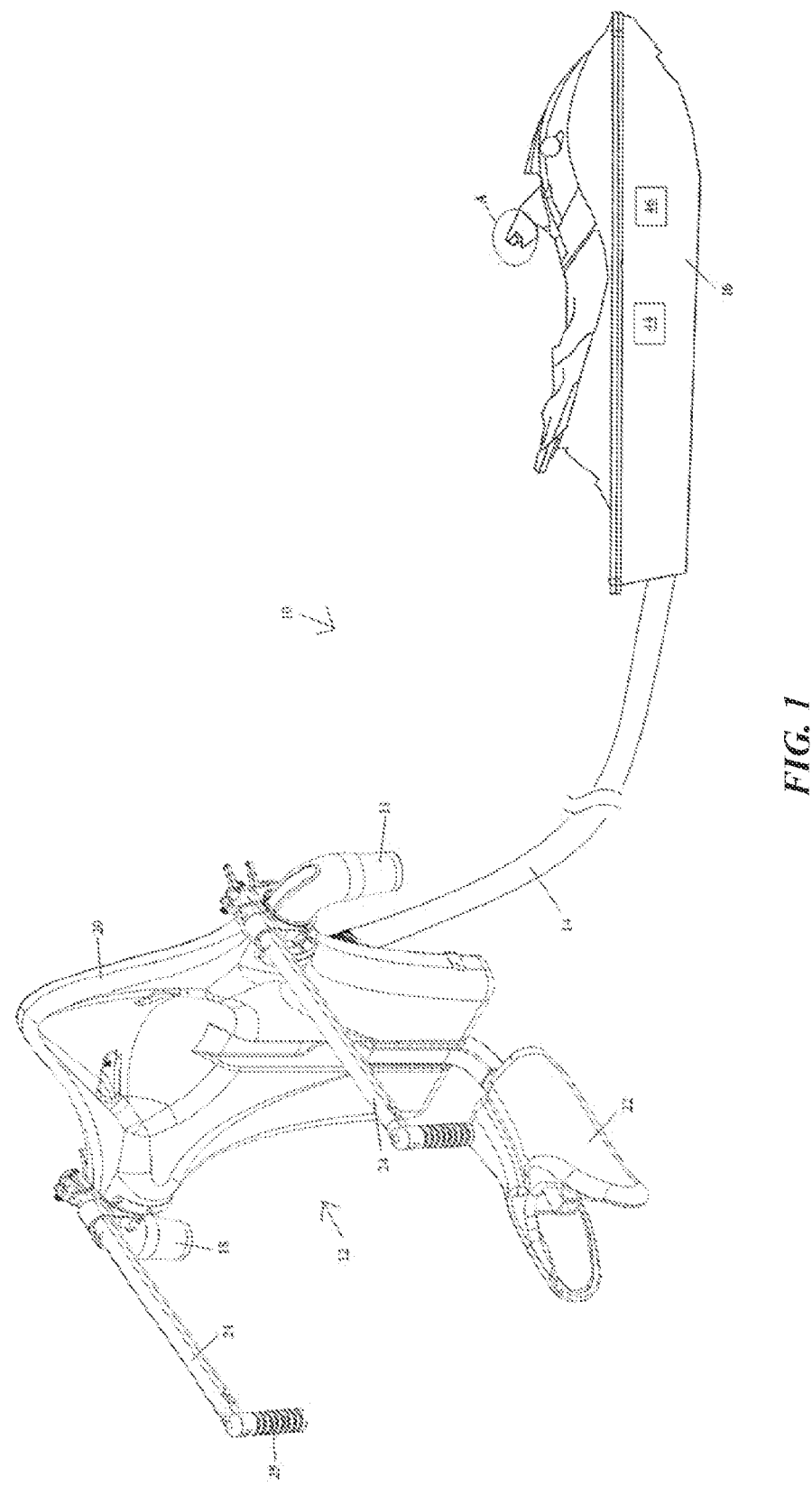
FIG. 1 is an illustration of an example of a personal propulsion device constructed in accordance with the principles of the present invention.

The present disclosure provides improved personal propulsion systems, as well as controls, components and methods of use thereof. In particular, and now referring to FIG. 1, an example of a personal propulsion system 10 is shown. The system 10 may generally include a passenger assembly 12, a fluid conduit or hose 14 connected to the passenger assembly 12, as well as a pressurized fluid source 16 attached to the conduit 14 to deliver fluid to the passenger assembly.

The pressurized fluid source or unit 16 may include an unmanned marine unit having a substantially water-tight hull (operable on a water surface and/or submersible), a boat, a personal watercraft such as a wave runner or jet ski, or a pump located on land or in/on a body of water. Additional features and examples of pressurized fluid sources are disclosed in U.S. Pat. No. 7,258,301 and U.S. patent application Ser. No. 14/276,148, the entirety of each of which is hereby incorporated by reference.

The passenger assembly 12 may include one or more components that provide or generate a force to aid in elevating, moving, stabilizing, and/or otherwise controllably using the system 10. For example, the passenger assembly 12 may include one or more nozzles or outlets 18 that discharge a fluid to move, stabilize, elevate, or otherwise affect the position of the passenger assembly 12. In the examples shown in FIGS. 1 and 2, the passenger assembly 12 includes a plurality of downward-facing nozzles that discharge pressurized fluid received from the pressurized fluid source 16 to move, stabilize, elevate or otherwise direct or orient the passenger assembly 12 as desired. Continuing to refer to FIGS. 1 and 2, the passenger assembly is generally configured to attach or support a torso of an individual, and includes a backrest 20, a seat 22, and control arms 24 that are operable to swivel or rotate the fluid outlets 18. The fluid outlets 18 are movable or rotatable about the remainder of the passenger assembly 12 to change the vector or output direction of fluid discharged by the outlets 18. The system 10 may include a throttle controller 25 coupled to or otherwise accessible from the passenger assembly 26 that is operable for and configured to control one or more functions or parameters of the operation of the pressurized fluid source 16, as described in more detail below. The throttle controller may include one or more user input interfaces, such as a twist-grip, buttons, switches, or other controls to operate or manipulate certain aspects of the functions and performance of the system 10. Additional features and examples of such features are disclosed in U.S. patent application Ser. No. 14/312,892, the entirety of each of which is hereby incorporated by reference.

The passenger assembly 12 may include a fluid delivery assembly 26 in fluid communication with the fluid outlets 18 to facilitate the delivery or routing of fluid to the outlets 18. For example, the fluid delivery assembly 26 may include one or more fluid conduit segments movably coupled to the backrest 20 that connect to a junction or joint with the fluid outlets, as shown in FIG. 2.

Figure 2:
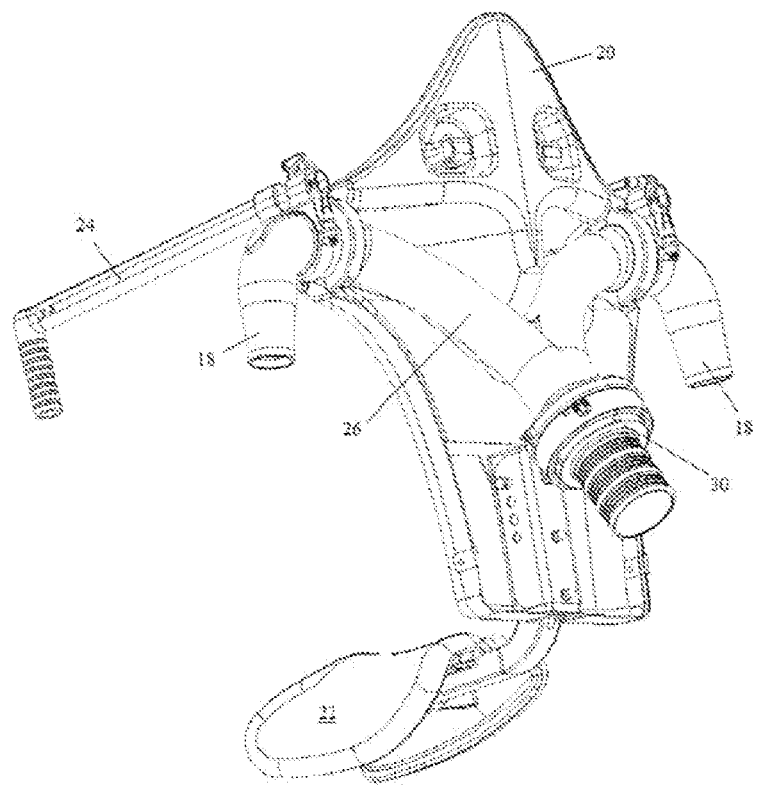
FIG. 2 is another illustration of the personal propulsion device shown in FIG. 1.

While an example of a jetpack-like variation of the passenger assembly 12 is shown in FIGS. 1 and 2, the passenger assembly 12 may take other forms or include other variations that can support one or more individuals from different orientations or at different contact or support points with respect to a passenger's body. For example, now referring to FIG. 3, a variation of the passenger assembly 12' is shown. The passenger assembly 12' may include one or more support surfaces 28 that a person can stand on or otherwise use to support themselves (with or without additional bindings, boots, fasteners or the like (not shown)). The passenger assembly 12' may also include one or more fluid outlets 18' and a fluid delivery assembly 26', as described above. Additional features and examples of such feature are disclosed in U.S. Pat. No. 8,336,805 and U.S. patent application Ser. Nos. 14/210, 102 and 14/276,341, the entirety of all of which is hereby incorporated by reference.

Figure 3:
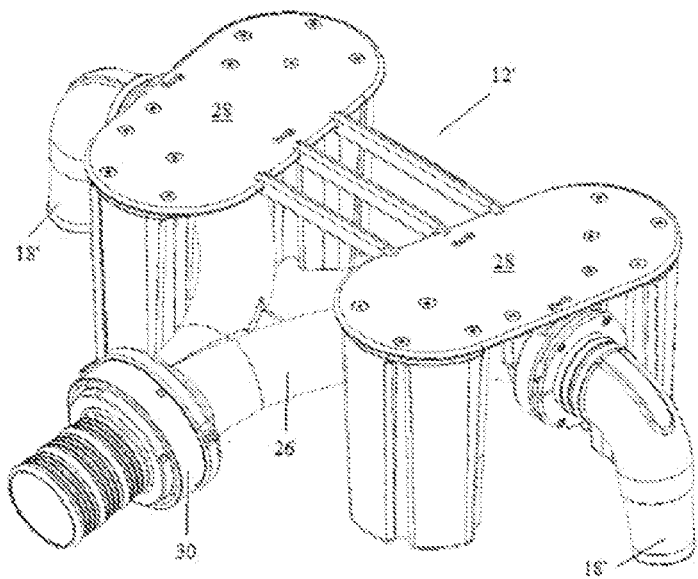
FIG. 3 is an illustration of an example of another personal propulsion device constructed in accordance with the principles of the present invention.
Figure 4:
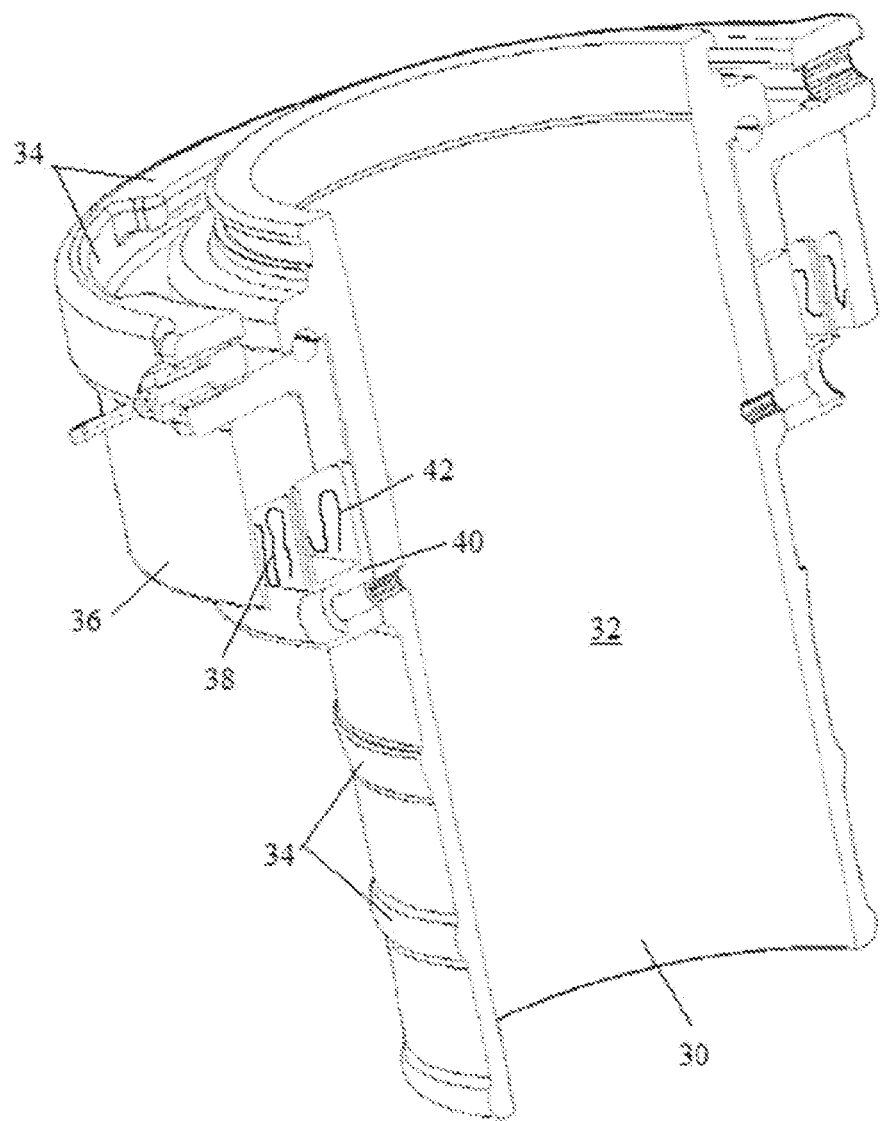
FIG. 4 is a cross-sectional illustration of an example of a connector constructed in accordance with the principles of the present invention.

Referring now to FIGS. 2 and 3, the system 10 may include a connector 30 coupled to the fluid delivery assembly 26 to facilitate transmission of electrical signals from the passenger assembly 12 and/or throttle controller 25 to the pressurized fluid source 16 (for ease of illustration and explanation, the fluid conduit 14 has been omitted from FIGS. 2 and 3). Referring to the cross-sectional illustration of the connector 30 in FIG. 4, the connector 30 may generally define a passage 32 for fluid flow therethrough. The connector 30 may also include one or more engagement or connection features or components 34 that allow secure, substantially waterproof connection to the fluid conduit 14 and the fluid delivery assembly 26, 26'. For example, the connection features may include one or more protruding ribs or tapered ridges to secure to the conduit 14, twist-lock mechanisms that engages to or couples with complimentary tabs or grooves on an end of the fluid delivery assembly 26, and/or other fitment components such as threaded surfaces, clamps, or the like. Of note, such water-tight connection characteristics may provide for a secure or rotatable, free-spinning relationship between the connector 30, fluid conduit 14, and/or fluid delivery assembly 26, 26'.

The connector 30 may include a first housing or segment 36 attached thereto, where the first segment 36 includes a first electrically conductive element 38 disposed therein or thereon. The connector 30 may also include a second housing or segment 40 attached thereto, where the second segment 40 includes a second electrically conductive element 42 disposed therein or thereon. The first and second segments 36, 40 may be rotatable with respect to one another and/or the portion of the connector 30 defining the passage 32, and may for example, circumscribe an exterior of the passage 32 in a coaxial arrangement with both the passage 32 and each other. The rotatable relationship between the different segments of the connector 30 may be achieved through the use of one or more ball bearings, bushings, seals, flanges, or the like.

The first and second electrically conductive elements 38, 42 may each include a coil or wire traversing a substantial circumference or width of the connector 30, and may be positioned substantially proximate or adjacent to one another to create an inductance signal therebetween for the transmission of electrical signals to and from the passenger assembly 26, throttle controller 25, and/or the pressurized fluid source 16. The first and second electrically conductive elements 38, 42 may otherwise be insulated from direct electrical conduction between one another, and waterproofed either within a fluid tight cavity or compartment of their respective connector segments, and/or sealed through the use of potting compounds or resins. One of the first and second electrically conductive elements 38, 42 may be in electrical communication with the throttle controller 25 (through either wired or wireless communication modalities), while the other electrically conductive elements may be in electrical communication (through either wired or wireless communication modalities) with the pressurized fluid source 16 to control or modify the operation of the pressurized fluid source 16, which may include modifying the delivery of pressurized fluid from the pressurized fluid source 16 to the fluid outlets 18 of the passenger assembly 12.

The rotatable configuration of the components of the connector 30 along with the non-contact, inductance modality of reliably transmitting power and data signals through the electrically conductive elements 38, 42 allows the fluid conduit 14 to spin freely and infinitely with respect to the passenger assembly 12 without concern for twisting wires or other data-transmitting components, while also reducing the likelihood of component failure due to exposure to the surrounding water during use of the system 10.

The system 10 may include one or more processors, analog-to-digital converters, filters, power sources, or other computer or electrical hardware and related software and/or firmware (collectively identified as '44' in FIG. 1) to provide the features discussed herein. Although shown in FIG. 1 as being positioned within the pressurized fluid source 16, the hardware/software 44 may be positioned or contained within the passenger assembly 12, along the fluid conduit 14, and/or in or on the pressurized fluid source 16 (or portions thereof).

Controlling or modifying the operation of the pressurized fluid source 16 form the passenger assembly 26 and/or the throttle controller 25 may be achieved in a number of different ways. For example, signals from the throttle controller 25 may be inductively transmitted through the first and second electrically conductive elements 38, 42 and received directly by one or more components of the pressurized fluid source 16 to affect the desired control (e.g., the throttle controller 25 may directly communicate through a wire harness or other connection with a CPU of the pressurized fluid source 16 to thus directly control the output or performance of the source).

Control of the pressurized fluid source 16 may alternatively be achieved through the addition of or intervention with a mechanical motor or actuator interfacing 46 with a throttle body on an engine in an engine compartment of the pressurized fluid source 16. Inputs into the throttle controller 25 can thus be interpreted or received by such intervening or intermediary actuator 46 to subsequently adjust the throttle body on the engine and affect the fluid output or delivery from the fluid source 16.

Figure 5:
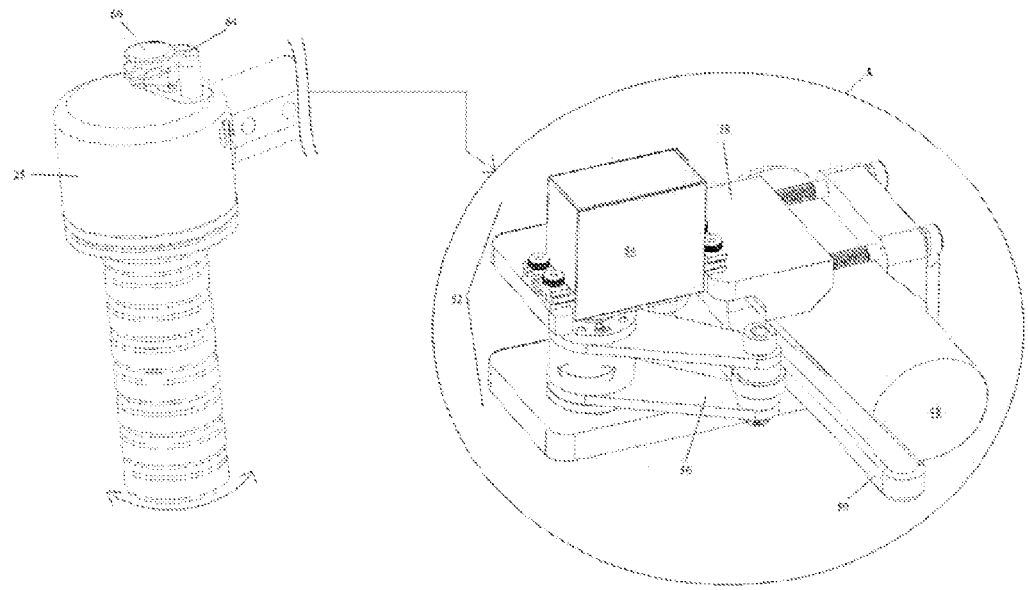
FIG. 5 is an illustration of an example of a control mechanism for a personal propulsion device constructed in accordance with the principles of the present invention.
Figure 6:
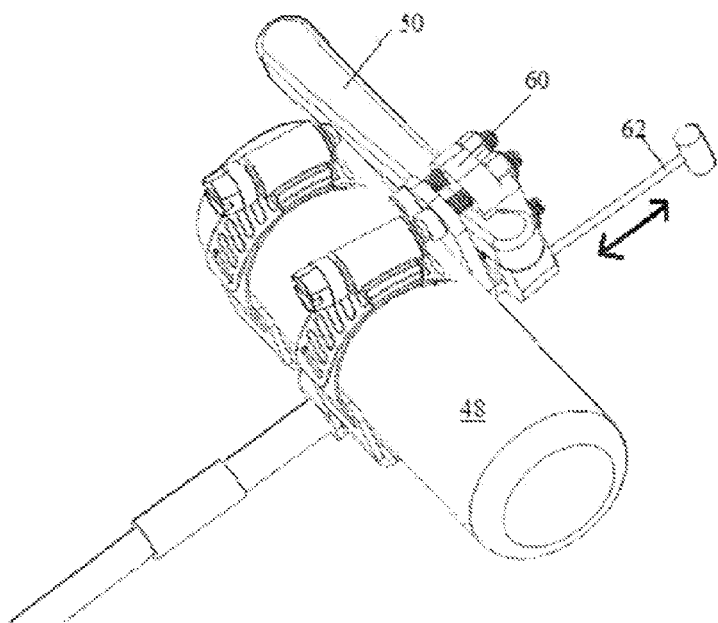
FIG. 6 is an illustration of another example of a control mechanism for a personal propulsion device constructed in accordance with the principles of the present invention.

Alternatively, the system 10 may include a mechanical actuation system that interfaces with an existing throttle input or control on the pressurized fluid source 16 itself. For example, in an example where the pressurized fluid source 16 is a personal watercraft, such watercraft typically include a throttle trigger or lever adjacent a handlebar of the watercraft, which is circled and labeled "A" in FIG. 1. Now referring to FIG. 5, a close up of the area "A" is shown, including the watercraft handlebar grip 48 and the throttle trigger/lever 50. A mechanical actuator or actuation assembly 52 is attached to the handlebar 48 and interfacing with the throttle lever 50 of the pressurized fluid source 16. The mechanical actuation assembly 52 is in communication with the throttle controller 25 that is operable by a person in the passenger assembly 12. Upon receiving a signal or other information/input from the throttle controller 25, the mechanical actuation assembly 52 operates to mechanically manipulate the throttle lever 50 of the pressurized fluid source 16, thereby controlling the fluid output of the fluid source 16. In the example shown in FIG. 5, the actuation assembly includes a servo motor 54 and a cam arm 56 that is rotated by the servo motor 54 to push (or release) the throttle lever 50. The actuation assembly 52 may be releasably attached to the handlebar 48 by a clamp 58 or other attachment means. An alternative example of the actuation assembly is shown in FIG. 6, and includes locating a servo motor (not shown) away from proximity to the handlebar grip 48. A clamp 60 is secured to the handlebar grip 48 and is movable to depress and release the throttle trigger 50. The clamp may be tightened and loosened (to increase and decrease depressing the throttle trigger 50) by a cable 62 that is coupled to the clamp 60. The cable 62 may be moved by a servo motor or other actuator at an opposite end of the cable 62 to provide control of the clamp 60, and thus the throttle trigger 50.

The ability to selectively position the mechanical actuation assembly into contact with the exiting throttle controls of the pressurized fluid source (which may include a watercraft) allows a user to institute remote throttle control of the pressurized fluid source (and thus, control of the fluid source while the person is secured to the passenger assembly) without making permanent or damaging modifications to the pressurized fluid source itself to effect such control.

The system 10 may include a throttle limitation or scaling feature that provides varying degrees of throttle responsiveness and/or selectable limits on the maximum output performance of the pressurized fluid source. For example, the system 10 may include one or more performance-selector fobs 64 that are uniquely identifiable by the system and result in reduced or scaled throttle control. The fob(s) 64 may be identifiable through magnetic, capacitance, or other identification means, which may also include RFID or near field communications to transmit an identifier from the fob 64 to the system 10. In one example, the fob 64 may also act as a key to disengage an emergency stop button 66 on the throttle controller, as shown in FIG. 5. In an exemplary use, a plurality of fobs 64 may be provided, where each fob corresponds to or includes a performance level indicator such as 'novice,' 'intermediate,' and 'expert.' When the 'novice' fob 64 is coupled to or otherwise identified by the system 10, the resulting throttle actuation of the pressurized fluid source 16 in response to inputs from the throttle controller 25 (for example, through the use of the actuation mechanism 52) may be scaled towards a lower range and the maximum output of the pressurized fluid source may be reduced below the actual capacity of the fluid source 16. When the 'intermediate' fob 64 is coupled to or otherwise identified by the system 10, the resulting throttle actuation of the pressurized fluid source 16 in response to inputs from the throttle controller 25 (for example, through the use of the actuation mechanism 52) may be scaled towards a middle range and the maximum output of the pressurized fluid source may be reduced, but closer to the actual capacity of the fluid source 16. When the ' ' advanced' fob 64 is coupled to or otherwise identified by the system 10, the resulting throttle actuation of the pressurized fluid source 16 in response to inputs from the throttle controller 25 may directly actuate the throttle output of the pressurized fluid source 16 without any scaling, and the maximum output of the pressurized fluid source may be available for use. Such identification or recognition of the particular fob 64 in use, and any scaling or modification of throttle control algorithms and output, may be achieved at least in part through the use of operational hardware and/or software 44.

It will be appreciated by persons skilled in the art that the present invention is not limited to what has been particularly shown and described herein above. In addition, unless mention was made above to the contrary, it should be noted that all of the accompanying drawings are not to scale. Of note, the system components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Moreover, while certain embodiments or figures described herein may illustrate features not expressly indicated on other figures or embodiments, it is understood that the features and components of the examples disclosed herein are not necessarily exclusive of each other and may be included in a variety of different combinations or configurations without departing from the scope and spirit of the invention. A variety of modifications and variations are possible in light of the above teachings without departing from the scope and spirit of the invention, which is limited only by the following claims.

What is claimed is:

1. A connector, comprising:
    a first connector segment defining a first end, a second end, and a passage therethrough;
    a first electrically conductive coil attached to the first connector segment; and
    a second electrically conductive coil rotatably coupled to the first connector segment adjacent to the first electrically conductive coil.

2. The connector of claim 1, wherein the first end of the first connector segment is configured to attach to a first fluid conduit substantially coaxially with the passage.

3. The connector of claim 2, wherein the second end of the first connector segment is configured to attach to a second fluid conduit substantially coaxially with the passage.

4. The connector of claim 1, wherein at least one of the first and second electrically conductive coils circumscribes an exterior of the passage.

5. The connector of claim 1, wherein at least one of the first and second electrically conductive coils is coaxial with the passage.

6. The connector of claim 1, wherein the first and second electrically conductive coils are configured to transmit an inductance signal therebetween.

7. The connector of claim 1, wherein the first and second electrically conductive coils are electrically insulated from each other.

8. The connector of claim 1, wherein the first and second electrically conductive coils are each contained within a waterproof enclosure.

9. A personal propulsion device, comprising:
    a passenger assembly configured to support a person;
    one or more fluid discharge ports coupled to the passenger assembly;
    a fluid delivery conduit in fluid communication with the one or more fluid discharge ports;
    a first electrically conductive element coupled to the fluid delivery conduit;
    a second electrically conductive element coupled to the fluid delivery conduit and rotatable with respect to the first electrically conductive element; and
    a throttle controller in electrical communication with the first electrically conductive element.

10. The personal propulsion device of claim 9, wherein the first and second electrically conductive elements are each coils and are electrically insulated from one another.

11. The personal propulsion device of claim 9, wherein the first and second electrically conductive elements are coaxially disposed around the fluid delivery conduit.

12. The personal propulsion device of claim 9, wherein the passenger assembly includes at least one of a backrest configured to attach to a person's torso and a platform configured to attach to a person's feet.

13. The personal propulsion device of claim 9, further comprising a pressurized fluid source in fluid communication with the fluid delivery conduit, wherein the throttle controller is operable to modify operation of the pressurized fluid source.

14. The personal propulsion device of claim 13, wherein the pressurized fluid source is a personal watercraft.

15. The personal propulsion device of claim 13, wherein the throttle controller communicates with the pressurized fluid source through an inductance signal bridging the first and second electrically conductive elements.

16. A personal propulsion device for use with a pressurized fluid source having a throttle, the personal propulsion device comprising:
    a passenger assembly;
    one or more fluid discharge ports coupled to the passenger assembly and operable to elevate the passenger assembly and a passenger into the air;
    a fluid delivery conduit in fluid communication with the one or more fluid discharge ports;
    a first inductance coil coupled to the fluid delivery conduit;
    a second inductance coil coupled to the fluid delivery conduit and rotatable with respect to the first inductance coil; and
    a throttle controller coupled to the passenger assembly, wherein the throttle controller is configured to transmit a signal across the first and second inductance coils to the pressurized fluid source.

17. The device of claim 16, wherein the signal transmitted to the pressurized fluid source modifies delivery of a pressurized fluid from the pressurized fluid source to the one or more fluid discharge ports.

18. The device of claim 16, further comprising a mechanical actuator attached to the throttle of the pressurized fluid source, wherein the mechanical actuator is in communication with the throttle controller.

19. The device of claim 18, wherein the mechanical actuator mechanically adjusts the throttle of the pressurized fluid source in response to a signal from the throttle controller.

20. The device of claim 18, wherein the mechanical actuator includes at least one of a servo motor and a clamp.

* * * * *